United States Patent [19]

Ikeguchi et al.

[11] 4,338,373

[45] Jul. 6, 1982

[54] COATING METHOD

[75] Inventors: Nobuyuki Ikeguchi; Yasunori Osaki, both of Tokyo, Japan

[73] Assignee: Mitsubishi Gas Chemical Company, Inc., Tokyo, Japan

[21] Appl. No.: 217,919

[22] Filed: Dec. 18, 1980

[30] Foreign Application Priority Data

Dec. 21, 1979 [JP] Japan .............................. 54-166697

[51] Int. Cl.$^3$ .............................................. B05D 5/12
[52] U.S. Cl. ............................ 428/383; 174/110 SR; 174/120 SR; 174/110 N; 427/118
[58] Field of Search ...................... 427/118; 428/383; 174/110 SR, 120 SR, 110 N

[56] References Cited

U.S. PATENT DOCUMENTS 3,822,147  7/1974  Koeinel .............................. 428/383
4,110,364  8/1978  Suzuki .............................. 528/170

OTHER PUBLICATIONS

Conference on Electrotechnical Materials, Bucharest Rumania, 1970.

*Primary Examiner*—Sam Silverberg
*Attorney, Agent, or Firm*—Browdy and Neimark

[57] ABSTRACT

A method for coating an article which comprises coating the article first with (I) at least one imide resin selected from the group consisting of polyester imide resins, polyamideimide resins, polyhydantoin resins and mixtures thereof, and then with (II) cyanate ester resin which comprises as essential components (a) at least one cyanate compound selected from the group consisting of polyfunctional cyanate esters, prepolymer of said cyanate esters, coprepolymer of said cyanate esters and an amine and mixtures thereof and (b) at least one maleimide compound selected from the group consisting of polyfunctional maleimides, prepolymer of said maleimides, coprepolymer of said maleimides and an amine and mixtures thereof is disclosed.

6 Claims, No Drawings

COATING METHOD

BACKGROUND OF THE INVENTION

This invention relates to a method of coating articles. More particularly, this invention relates to a method for coating an article which comprises coating the article first with (I) at least one imide resin selected from the group consisting of polyester imide resins, polyamideimide resins, polyhydantoin resins and mixtures thereof, and then with (II) cyanate ester resin which comprises as essential components (a) at least one cyanate compound selected from the group consisting of polyfunctional cyanate esters, prepolymer of said cyanate esters, coprepolymer of said cyanate esters and an amine and mixtures thereof and (b) at least one maleimide compound selected from the group consisting of polyfunctional maleimides, prepolymer of said maleimides, coprepolymer of said maleimides and an amine and mixtures thereof.

Enamelled wires are produced by baking thick coating of varnish (usually 50μ thick) formed directly on a copper wire or other conductors. Resins such as polyester imide, polyamideimide, polyhydantoin and polyparabanic acid are known as baking resins having high heat resistance, high flexibility, etc, but they are not ideal for use in applications that require high moisture resistance, water resistance and chemical resistance.

SUMMARY OF THE INVENTION

The primary object of this invention is to provide a method for coating an article with layer having high flexibility, heat resistance, moisture resistance and chemical resistance and which has intimate contact with the article on which such layer is formed. The method comprises (I) coating an article, such as a copper wire or other substrates with at least one imide resin selected from the group consisting of polyester imide resins, polyamideimide resins and polyhydantoin resins, and (II) further coating the coated article with cyanate ester resin comprising as essential components (a) at least one cyanate compound selected from the group consisting of polyfunctional cyanate esters, prepolymers of said cyanate esters or coprepolymers of said cyanate esters and an amine and (b) at least one maleimide compound selected from the group consisting of polyfunctional maleimides, prepolymers of said maleimides, or coprepolymers of said maleimides and an amine. The second coating has high heat resistance, chemical resistance, water resistance, etc. without sacrificing the high flexibility of the first coating.

DETAILED DESCRIPTION OF THE INVENTION

The resin which forms the first or inner coating on an article according to this invention is described hereunder. The polyester imide is known as polyester imide resins having an imide ring and ester group in the main chain as repeating units. Such resins are typically produced by (1) forming an imide ring by reaction between trimellitic anhydride and aminoalcohol or aromatic diamine and converting the reaction product to an ester by optional addition of a diol or dicarboxylic acid, (2) reacting a polyester having a terminal OH or acid with aromatic diamine and trimellitic anhydride, and (3) forming bisphthalic anhydride from aromatic diol and trimellitic anhydride and reacting the anhydride with diamine. The coating of polyesterimide may be baked by a conventional technique, and when the resin (II) to be applied next is a varnish, the first coating needs to be baked to such degree that it is not dissolved in a solvent for the varnish.

The polyamideimide is a polymer having an amide bond moiety and an imide bond moiety in the molecule. The polymers are typically produced by (1) reacting trimellitic anhydride with aromatic diamine or aromatic diisocyanate, and (2) reacting pyromellitic anhydride, aromatic diamine and aromatic dicarboxylic acid or aromatic aminocarboxylic acid. Polyamideimide resins having a heterocyclic ring such as a hydantoin ring may also be used. The coating of polyamideimide may be applied by a known method and the wet process is generally preferred. If the wet process is used, a solvent for varnish such as cresol that is reactive with a cyanate ester needs to be substantially removed from the resulting coating before application of the second or outer coating. In outer coating processes, drying conditions may be used that do not cause substantial dissolution of the polyamideimide coating when the second coating is being formed.

The polyhydantoin is a resin having a hydantoin ring in the main chain, and a resin containing an aromatic ring or imide ring as well as the hydantoin ring is included in the definition of the polyhydantoin. Illustrative commercial products of the polyhydantoin are Resistfol and Resisherm (available from Bayer Co.). The coating of the polyhydantoin is generally formed by the wet process using varnish, followed by drying with heat. Some varnishes of the polyhydantoin use cresol as the solvent, and cresol must be substantially removed before application of the second coating because it acts as a catalyst to cure the cyanate ester resin of which the second coating is made according to this invention.

The cyanate ester resin composition used to form the second coating is described hereunder.

By polyfunctional cyanate ester is meant a compound having at least two cyanate groups in its molecule. The polyfunctional cyanate ester is represented by the formula

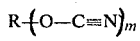

wherein R is an aromatic nucleus-containing residue which is selected from the group consisting of a residue derived from an aromatic hydrocarbon selected from the group consisting of benzene, biphenyl and naphthalene, a residue derived from a compound in which at least two benzene rings are bonded to each other by a bridging member selected from the group consisting of

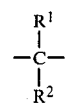

wherein $R^1$ and $R^2$ are the same or different and each represents a hydrogen atom or an alkyl group containing 1 to 4 carbon atoms,

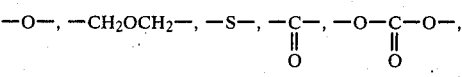

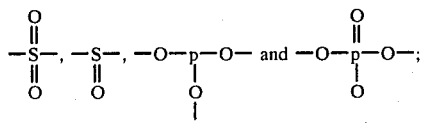

said aromatic nucleus is optionally substituted by a substituent selected from the group consisting of alkyl groups containing 1 to 4 carbon atoms, alkoxy groups containing 1 to 4 carbon atoms, chlorine and bromine; m is an integer of 2 to 5, and the cyanate group is always directly bonded to the aromatic nucleus.

Examples of the polyfunctional cyanate ester include dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane, 2,2-bis(3,5-dichloro-4-cyanatophenyl)propane, 2,2-bis(3,5-diblomo-4-cicyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak derived from novolak cyanated bisphenol type polycarbonate oligomer derived from bisphenol type polycarbonate oligomer and mixture thereof. Other cyanate esters employed in the practice of this invention are given in Japanese Patent Publication Nos. 1928/1966, 4791/1969, 11712/1970 and 41112/1979 and Japanese Patent Publication (laid open) No. 63129/1976 which are incorporated herein for references. The above-mentioned cyanate esters may be used as mixtures.

Prepolymers may be used containing a sym-triazine ring which is prepared by the trimerization of the cyanate groups of the cyanate ester, and which have an average molecular weight of at least 400 but no more than 6,000. Such prepolymers can be prepared by polymerizing the above cyanate esters in the presence of, as a catalyst, an acid such as a mineral acid or a Lewis acid, a base such as sodium hydroxide, a sodium alcoholate or a tertiary amine, or a salt such as sodium carbonate or lithium chloride.

The polyfunctional cyanate ester can be used in the form of a mixture of the monomer and the prepolymer. For example, many of the commercially available cyanate esters derived from bisphenol A and cyanogen halide are in the form of mixtures of cyanate monomers and prepolymers, and such materials can also be used in the present invention.

A coprepolymer of the cyanate ester and an amine may be used as the cyanate ester component. Examples of the amines include meta- or para-phenylenediamine, meta- or para-xylylenediamine, 1,4- or 1,3-cyclohexanediamine, hexahydroxylylenediamine, 4,4'-diaminobiphenyl, bis(4-aminophenyl)methane, bis(4-aminophenyl)ether, bis(4-aminophenyl)sulfone, bis(4-amino-3-methylphenyl)methane, bis(3-chloro-4-aminophenyl)methane, bis(4-amino-3,5-dimethylphenyl)methane, bis(4-aminophenyl)cyclohexane, 2,2-bis(4-aminophenyl)propane, 2,2-bis(4-amino-3-methylphenyl)propane, 2,2-bis(3,5-dibromo-4-aminophenyl)propane, bis(4-aminophenyl)phenylmethane, 3,4-diaminophenyl-4'-aminophenylmethane and 1,1-bis(4-aminophenyl)-1-phenylethane.

A mixture of prepolymer of the cyanate ester and coprepolymer of the cyanate ester and an amine may be used as component (a) of this invention.

The polyfunctional maleimides employed in the present invention are organic compounds having two or more maleimide groups derived from maleic anhydride and a polyamine and are represented by the following general formula

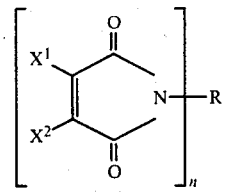

wherein R represents divalent to pentavalent aromatic or alicyclic organic group, each of $X^1$ and $X^2$ represents a hydrogen atom, halogen atom or alkyl group, and n represents integer of 2–5.

The maleimides represented by the above formula can be produced by a method known per se which involves reacting maleic anhydride with polyamine to form a maleamide acid, and then dehydro-cyclizing the maleamide acid.

Aromatic amines are preferable as the starting polyamines. The reason is that the resulting object resin has excellent properties, such as heat-resistance, etc. When the resulting object resins have desirable flexibility and pliability, alicyclic amine alone or combination of the alicyclic amines and other amines may be used. Though secondary amines can be used as the starting amine, the primary amines are preferable.

Amines employed in reaction with cyanate esters for preparing coprepolymers of the cyanate ester and the amine may be profitably used as an amine component for preparing maleimides. In addition to the above-mentioned amines, melamine having s-triazine ring and polyamines obtained by reaction aniline with formaldehyde, in which two or more benzene rings are bonded through methylene bond, may also be used.

The functional maleimides as mentioned above may be used alone or as a mixture. Also the prepolymer of the maleimide obtained by heating the maleimide in the presence or absence of a catalyst may be used. In addition, coprepolymers of the maleimide and the amine employed for synthesizing the polyfunctional maleimide may be used.

These compositions are optionally mixed with another reactive monomer and prepolymer, examples of which include epoxy resins; (meth)acrylates, such as methacrylates, acrylates, methacrylic epoxy esters, acrylic epoxy esters, acrylic alkenyl ester, methacrylic alkenyl ester, its prepolymers; polyallyl compounds, such as diallyl phthalate, divinylbenzene, diallylbenzene, trialkenyl isocyanulates or its prepolymers; phenol resins; polyvinyl acetal resins, such as polyvinyl formal, polyvinyl acetal, or polyvinyl butyral; acrylic resins, silicone resins, or alkyd resins having OH group or COOH group and liquid or elastic rubbers, such as polybutadiene, butadiene-acrylonitrile copolymer, polychloroprene, butadiene-styrene copolymer, polyisoprene or natural rubber.

The cyanate ester resin composition composed of these ingredients and used to form the second coating in this invention cures in the absence of a catalyst, but a curing agent is usually used to promote the curing of the composition.

Examples of the catalyst include imidazoles, such as 2-methylimidazole, 2-undecylimidazole, 2-heptadecyl imidazole, 2-phenylimidazole, 2-ethyl 4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole and addition product of an imidazole and trimellitic acid; tertiary amines, such as N,N-dimethyl benzylamine, N,N-dimethylaniline, N,N-dimethyltoluidine, N,N-dimethyl-p-anisidine, p-halogeno-N,N-dimethylaniline, 2-N-ethylanilino ethanol, tri-n-butylamine, pyridine, quinoline, N-methylmorphline, triethanolamine, triethylenediamine, N,N,N',N'-tetramethylbutanediamine, N-methylpiperidine; phenols, such as phenol, cresol, xylenol, resorcine, and phloroglucin; organic metal salts, such as lead naphthenate, lead stearate, zinc naphthenate, zinc octoate, tin oleate, dibutyl tin maleate, manganese naphthenate, cobalt naphthenate, and acetyl acetone iron; and inorganic metal salts, such as stannic chloride, zinc chloride and aluminum chloride; peroxides, such as benzoyl peroxide, lauroyl peroxide, octanoyl peroxide, acetyl peroxide, para-chlorobenzoyl peroxide and di-t-butyl diperphthalate; acid anhydrides, such as maleic anhydride, phthalic anhydride, lauric anhydride, pyromellitic anhydride, trimellitic anhydride, hexahydrophthalic anhydride, hexa hydropyromellitic anhydride and hexahydrotrimellitic anhydride; azo compounds, such as azoisobutylonitrile, 2,2'-azobispropane, m,m'-azoxystyrene, hydrozones, and mixtures thereof.

In addition to the above-mentioned catalysts, a curing agent for epoxy resin and a curing catalyst for epoxy resin may be used as a catalyst of this invention.

The amount of the catalyst employed may be less than 5% by weight of total composition.

To impart specific properties, a variety of additives may be added to the curable composition used to from the second coating, provided that they do not impair the essential properties of the resulting resin. Examples of the additives include fibrous reinforcement, fillers, pigments, dyestuffs, thickening agent, lubricants, flame-retardants and the like. The curable cyanate ester compositions of this invention used to form the second coating are present in a wide range of forms from liquid to solid at room temperature, depending on the respective natures of the components constituting the composition, and the preliminary reaction conditions. Solid curable composition, liquid curable composition or solution of the composition in solvent may be used according to the use purpose.

The curing conditions of the coating of this invention depend on proportion of components constituting the composition and the nature of the components employed. In general, the coating of this invention may be cured by heating it at a temperature within the range of 100°–250° C.

The coating thus prepared by the method of this invention has the desired combination of bonding property, intimate contact, heat resistance and electrical properties, and it also has high flexibility, wear resistance, chemical resistance and moisture resistance, thus providing a coating that enjoys utility in a wide variety of applications.

This invention is now described in greater detail by reference to the following examples and comparative examples to which the invention is by no means limited.

EXAMPLE 1

A solution of polyester imide (product of Bayer AG.) in a mixture of N,N-dimethylformamide and m-xylene was applied to a copper wire, and dried with heat. A product obtained by reactions 800 g of 2,2-bis(4-cyanatophenyl)propane with 200 g of bis(4-maleimidophenyl)methane at 150° C. for 120 minutes was dissolved in a mixture of methyl ethyl ketone and N,N-dimethylformamide. A varnish composition was prepared by mixing the solution with a catalyst composed of 0.5 g of zinc octoate and 0.3 g of triethylenediamine, and applied onto the polyester imide coating, and dried with heat. The properties of the resulting coating are shown in Table 1 below.

COMPARATIVE EXAMPLE 1

A polyester imide solution the same as what was used in Example 1 was applied to a copper wire and dried with heat. A product obtained by heating 1000 g of 2,2-bis(4-cyanatophenyl)propane at 150° C. for 420 minutes was dissolved in methyl ethyl ketone, and the solution was mixed with a catalyst made of 0.5 g of zinc octoate, 0.1 g of catechol and 0.3 g of triethylenediamine, and the resulting mixture was applied to the first coating and dried with heat. The properties of the coating formed are shown in Table 1 below.

TABLE 1

|  | Ex. 1 | Comp. Ex. 1 |
| --- | --- | --- |
| wire size (mm) | 1.000 | 1.000 |
| coating thickness (mm) | 0.045 | 0.045 |
| abrasion resistance (times) |  |  |
| two-way, load = 600 g) | 49 | 45 |
| end pick-up (in 20 hrs) | 230° C. OK | 200° C. OK |
| pressure cooker resistance |  | resin |
| (120° C., 2 atm., 30 hrs) | no change | blushed |
| winding property | good | good |

EXAMPLE 2

A solution of a solid polyester imide resin (Brijinol E-35, product of Dainichi Seika Color & Chemicals Mfg. Co., Ltd.) in a mixture of N,N-dimethylformamide and m-xylene was applied to an iron piece and dried with heat. A product obtained by reacting 900 g of 2,2-bis(4-cyanatophenyl)ether with 100 g of bis(4-maleimidophenyl)ether at 150 for 90 minutes was dissolved in methyl ethyl ketone, and in the solution, 200 g of a novolak type epoxy resin (ECN-1273 of Ciba-Geigy AG.) was further dissolved. A resin solution was prepared by mixing such solution with 0.4 g of zinc octoate and 0.4 g of pyromellitic anhydride and was applied to the first coating and dried with heat. The properties of the resulting coating are set forth in Table 2 below.

COMPARATIVE EXAMPLE 2

A polyester imide the same as what was used in Example 2 was applied to an iron piece and dried with heat. The properties of the coating formed are set forth in Table 2 below.

TABLE 2

|  | Ex. 2 | Comp. Ex. 2 |
| --- | --- | --- |
| coating thickness (mm) | 0.043 | 0.043 |

TABLE 2-continued

| | Ex. 2 | Comp. Ex. 2 |
|---|---|---|
| abrasion resistance (times) (two-way, load = 600 g) | 45 | 34 |
| dielectric breakdown | good | good |
| changing characteristic in water | good | changed slightly |

EXAMPLE 3

A polyamideimide resin (HI-400, product of Hitachi Chemical Co., Ltd.) was dissolved in a mixture of N,N-dimethylformamide and N-methyl-2-pyrrolidone, and the solution was applied to a copper wire, followed by evaporation of the solvent to dryness.

A product obtained by reacting 400 g of 2,2-bis(4-cyanatophenyl)ether with 600 g of bis(4-maleimidophenyl)ether at 150° C. for 65 minutes, and dissolved in N,N-dimethylformamide. A varnish composition was prepared by mixing the solution with 150 g of a novolak type epoxy resin (ECN-1273 of Ciba-Geigy AG.) and a catalyst composed of 0.4 g of zinc octoate and 0.5 g of phthalic anhydride. The varnish was applied to the first coating and after evaporating the solvent to dryness, the resulting coating was cured at 240° C. for 4 hours. The properties of the coating are shown on Table 3 below.

COMPARATIVE EXAMPLE 3

A copper wire used in Example 3 was coated with only a polyamideimide resin the same as used in Example 3 to a thickness the same as provided in that example. The properties of the coating formed are indicated in Table 3 below.

TABLE 3

| | Ex. 3 | Comp. Ex. 3 |
|---|---|---|
| wire size (mm) | 1.100 | 1.100 |
| coating thickness (mm) | 0.039 | 0.039 |
| winding property | good | good |
| end pick-up (in 10 hrs) | 300° C. OK | 300° C. OK |
| pressure cooker resistance (in steam at 120° C., 2 atm. for 50 hrs) | no change | changed slightly |

EXAMPLE 4

A polyamideimide resin (Allotherm 602 of Dr. Beck) dissolved in N-methyl-2-pyrrolidone was applied to a copper wire and dried. A product obtained by reacting 800 g of 2,2-bis(4-cyanatophenyl)propane with 200 g of bis(4-maleimidophenyl)methane at 150° C. for 120 minutes was dissolved in a mixture of methyl ethyl ketone and N,N-dimethylformamide, and the solution was mixed with a catalyst composed of 0.5 g of zinc octoate and 0.4 g of triethylenediamine. The resulting coating solution was applied to the first coating and dried at 200° C. The properties of the coating formed are shown in Table 4 below.

COMPARATIVE EXAMPLE 4

A copper wire used in Example 4 was coated with only a polyamideimide resin the same as used in Example 4. The properties of the coating formed are shown in Table 4 below.

EXAMPLE 5

A polyamideimide resin the same as what was used in Example 4 was applied to a copper wire and dried. A product obtained by reacting 800 g of 2,2-bis(4-cyanatophenyl)propane with 200 g of bis(4-maleimidophenyl)methane at 150° C. for 120 minutes was dissolved in a mixture of methyl ethyl ketone and N,N-dimethylformamide, and the solution was mixed with 200 g of an epoxy resin (ECN-1273 of Ciba-Geigy AG.) and a catalyst composed of 0.5 g of zinc octoate and 0.4 g of triethylenediamine. The resulting varnish was applied to the first coating and dried at 200° C. The properties of the coating formed are shown in Table 4 below.

TABLE 4

| | Ex. 4 | Comp. Ex. 4 | Ex. 5 |
|---|---|---|---|
| wire size (mm) | 1.050 | 1.050 | 1.050 |
| coating thickness (mm) | 0.043 | 0.043 | 0.043 |
| winding property | good | good | good |
| abrasion resistance (times) (two-way, load = 600 g) | 302 | 230 | 295 |
| chemical resistance (immersed for 7 days) methyl ethyl ketone | no change | no change | no change |
| N,N-dimethylformamide | no change | changed slightly | no change |
| pressure cooker resistance (100 hrs in steam at 120° C., 2 atm.) | no change | changed slightly | no change |

EXAMPLE 6

A polyhydantoin resin (Resitherm PH-10 of Bayer AG.) was applied to a copper wire and dried with heat. A product obtained by reacting 920 g of 2,2-bis(4-cyanatophenyl)propane, 64 g of bis(4-maleimidophenyl)methane and 16 g of a mixture of 4-maleimidophenyl-3',4'-dimaleimidephenyl methane and 4-maleimidophenyl-2',4'-dimaleimidephenyl methane at 145° C. for 75 minutes was dissolved in a mixture of methyl ethyl ketone and N,N-dimethylformamide, and the solution was mixed with a catalyst composed of a mixture of 0.5 g of zinc octoate and 0.3 g of triethylenediamine. The resulting varnish was applied to the coating of polyhydantoin coating, dried and cured with heat. The properties of the coating formed are set forth in Table 5.

COMPARATIVE EXAMPLE 5

A copper wire was coated with only a polyhydantoin resin the same as used in Example 6. The properties of the coating formed are shown in Table 5.

EXAMPLE 7

A product obtained by reacting 900 g of 2,2-bis(4-cyanatophenyl)propane with 100 g of bis(4-maleimidophenyl)methane at 150° C. for 200 minutes was dissolved in a mixture of methyl ethyl ketone and N,N-dimethylformamide. The solution was mixed with 100 g of an epoxy resin (Epikote 1001 of Shell Chem. Co.) and a catalyst composed of 0.4 g of zinc octoate and 0.4 g of triethylenediamine. The resulting varnish was applied to the polyhydantoin coating, followed by drying and curing with heat. The properties of the coating obtained are shown in Table 5.

TABLE 5

| | Ex. 6 | Comp. Ex. 5 | Ex. 7 |
|---|---|---|---|
| wire size (mm) | 1.000 | 1.000 | 1.000 |
| coating thickness (mm) | 0.041 | 0.041 | 0.041 |
| winding property | good | good | good |
| end pick-up (10 hrs) | 250° C. OK | 210° C. OK | 250° C. OK |

TABLE 5-continued

|  | | Ex. 6 | Comp. Ex. 5 | Ex. 7 |
|---|---|---|---|---|
| abrasion resistance (times) (two-way, load = 600 g) | | 270 | 200 | 270 |
| chemical resistance (immersed for 24 hrs) | methyl ethyl ketone | no change | no change | no change |
| | (N,N-dimethyl-formamide) | no change | changed slightly | no change |

In these Example, "winding property" means winding property when the coated wire is wound around a substrate in the same diameter.

What dielectric breakdown is good shows dielectric strength is more than 15 KV/mm thick.

What is claimed is:

1. A method for coating an article which comprises coating the article first with (I) at least one imide resin selected from the group consisting of polyester imide resins, polyamideimide resins, polyhydantoin resins and mixtures thereof, and then with (II) cyanate ester resin which comprises as essential components (a) at least one cyanate compound selected from the group consisting of polyfunctional cyanate esters, prepolymer of said cyanate esters, coprepolymer of said cyanate esters and an amine and mixtures thereof and (b) at least one maleimide compound selected from the group consisting of polyfunctional maleimides, prepolymer of said maleimides, coprepolymer of said maleimides and an amine and mixtures thereof.

2. The method as defined in claim 1 wherein the imide resin is a polyesterimide resin.

3. The method as defined in claim 1 wherein the imide resin is a polyamideimide resin.

4. The method as defined in claim 1 wherein the imide resin is a polyhydantoin resin.

5. The method as defined in claim 1 wherein the cyanate ester is selected from the group consisting of 1,3-, or 1,4-dicyanatobenzene; 1,3,5-tricyanatobenzene; 1,3-, 1,4-, 1,6-, 1,8-, 2,6- or 2,7-dicyanatonaphtnalene, 1,3,6-tricyanatonaphthalene; 4,4'-dicyanatobiphenyl; bis(4-cyanatophenyl)methane; 2,2-bis(4-cyanatophenyl)propane, 2,2-bis(3,5-dichloro-4-cyanatophenyl)propane, 2,2-bis(3,5-diblomo-4-dicyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak derived from novolak cyanated bisphenol type polycarbonate oligomer derived from bisphenol type polycarbonate oligomer; and mixture thereof.

6. A coated product, preferably a coated wire, produced by the method of any one of claims 1 to 5.

* * * * *